US009066370B2

(12) United States Patent
Srinivasan et al.

(10) Patent No.: US 9,066,370 B2
(45) Date of Patent: *Jun. 23, 2015

(54) PROVIDING DATA TO A MOBILE APPLICATION ACCESSIBLE AT A MOBILE DEVICE VIA DIFFERENT NETWORK CONNECTIONS WITHOUT INTERRUPTION

(71) Applicant: Seven Networks, Inc., Redwood City, CA (US)

(72) Inventors: Suresh Srinivasan, Foster City, CA (US); Yuan Kang Lee, San Diego, CA (US); Chaitali Sengupta, Richardson, TX (US)

(73) Assignee: Seven Networks, Inc., San Carlos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/784,486

(22) Filed: Mar. 4, 2013

(65) Prior Publication Data

US 2013/0229270 A1 Sep. 5, 2013

Related U.S. Application Data

(60) Provisional application No. 61/606,053, filed on Mar. 2, 2012.

(51) Int. Cl.
*G08B 3/00* (2006.01)
*H04W 88/06* (2009.01)
(Continued)

(52) U.S. Cl.
CPC .............. *H04W 88/06* (2013.01); *H04W 36/22* (2013.01); *H04W 36/14* (2013.01); *H04W 36/18* (2013.01)

(58) Field of Classification Search
CPC ..... H04W 36/14; H04W 36/18; H04W 36/22; H04W 88/06; H04W 36/02; H04W 28/02; H04W 28/06; H04W 76/00; H04W 8/26; H04W 36/24; H04W 36/30; H04W 48/18
USPC .......................................................... 455/436
See application file for complete search history.

(56) References Cited

U.S. PATENT DOCUMENTS 5,754,542 A    5/1998   Ault et al.
7,009,952 B1   3/2006   Razavilar et al.
(Continued)

FOREIGN PATENT DOCUMENTS

EP    1701576 A1    9/2006
EP    2095664 A1    9/2009
(Continued)

OTHER PUBLICATIONS

IPRP for Application No. PCT/US2013/028922 mailed Sep. 12, 2014.
(Continued)

*Primary Examiner* — Timothy Pham
(74) *Attorney, Agent, or Firm* — NKK Patent Law, PLLC

(57) ABSTRACT

System and method of providing data to a mobile application accessible at a mobile device via different network connections without interruption are disclosed. The method, which may be implemented on a system includes, receiving data for the mobile application over a network connection different from a first network connection, and/or providing the data received over the network connection including any other data received from the first network connection, to the mobile application in a manner that is without interruption in data flow. The data is provided to the mobile application without interruption even when connections to the different network connections require change in IP addresses.

26 Claims, 10 Drawing Sheets

(51) Int. Cl.
*H04W 36/22* (2009.01)
*H04W 36/00* (2009.01)
*H04W 4/00* (2009.01)
*H04W 36/14* (2009.01)
*H04W 36/18* (2009.01)

(56) References Cited

U.S. PATENT DOCUMENTS

| | | |
|---|---|---|
| 7,161,914 B2 | 1/2007 | Shoaib et al. |
| 7,539,519 B2 | 5/2009 | Ko et al. |
| 7,570,945 B2 | 8/2009 | Lee et al. |
| 7,620,015 B2 | 11/2009 | Lenzarini |
| 7,697,930 B2 | 4/2010 | Miao et al. |
| 7,711,366 B1 | 5/2010 | O'Neil et al. |
| 8,126,461 B2 | 2/2012 | Sengupta et al. |
| 8,279,831 B2 | 10/2012 | Sengupta et al. |
| 8,391,872 B1 | 3/2013 | Shetty et al. |
| 2002/0035699 A1 | 3/2002 | Crosbie |
| 2002/0045424 A1 | 4/2002 | Lee |
| 2002/0191627 A1* | 12/2002 | Subbiah et al. ............... 370/428 |
| 2003/0193910 A1 | 10/2003 | Shoaib et al. |
| 2004/0028030 A1 | 2/2004 | Lai et al. |
| 2004/0087307 A1 | 5/2004 | Ibe et al. |
| 2004/0233866 A1* | 11/2004 | Bossoli et al. ............... 370/328 |
| 2004/0264414 A1 | 12/2004 | Dorenbosch |
| 2005/0054325 A1 | 3/2005 | Morper |
| 2005/0068982 A1 | 3/2005 | Guo et al. |
| 2005/0159153 A1 | 7/2005 | Mousseau et al. |
| 2005/0176473 A1 | 8/2005 | Melpignano |
| 2005/0249161 A1 | 11/2005 | Carlton |
| 2005/0251832 A1 | 11/2005 | Chiueh |
| 2005/0288045 A1 | 12/2005 | Yang et al. |
| 2006/0018309 A1 | 1/2006 | Lee et al. |
| 2006/0025151 A1 | 2/2006 | Karaoguz et al. |
| 2006/0052113 A1 | 3/2006 | Ophir et al. |
| 2006/0099952 A1 | 5/2006 | Prehofer |
| 2006/0140150 A1 | 6/2006 | Olvera-Hernandez et al. |
| 2006/0221901 A1 | 10/2006 | Yaqub et al. |
| 2006/0223465 A1 | 10/2006 | Akiba et al. |
| 2006/0268848 A1 | 11/2006 | Larsson et al. |
| 2006/0285519 A1 | 12/2006 | Narayanan et al. |
| 2006/0291419 A1 | 12/2006 | McConnell et al. |
| 2007/0008925 A1 | 1/2007 | Dravida et al. |
| 2007/0014281 A1 | 1/2007 | Kant |
| 2007/0030826 A1 | 2/2007 | Zhang et al. |
| 2007/0032239 A1 | 2/2007 | Shaheen et al. |
| 2007/0091855 A1 | 4/2007 | Karaoguz et al. |
| 2007/0115899 A1 | 5/2007 | Ovadia et al. |
| 2007/0173283 A1 | 7/2007 | Livet et al. |
| 2007/0197227 A1 | 8/2007 | Naqvi et al. |
| 2007/0213059 A1 | 9/2007 | Shaheen |
| 2008/0008127 A1 | 1/2008 | Choi et al. |
| 2008/0080480 A1 | 4/2008 | Buckley et al. |
| 2008/0089289 A1 | 4/2008 | Jayaram et al. |
| 2008/0101292 A1 | 5/2008 | Sengupta et al. |
| 2008/0102815 A1 | 5/2008 | Sengupta et al. |
| 2008/0102832 A1 | 5/2008 | Sengupta et al. |
| 2008/0123685 A1 | 5/2008 | Varma et al. |
| 2008/0130581 A1 | 6/2008 | Hwang et al. |
| 2008/0214190 A1 | 9/2008 | Aalto |
| 2009/0075657 A1 | 3/2009 | Klatt |
| 2009/0168726 A1 | 7/2009 | Thalanany et al. |
| 2009/0180440 A1 | 7/2009 | Sengupta et al. |
| 2009/0219894 A1 | 9/2009 | Jee et al. |
| 2009/0327546 A1 | 12/2009 | Guri et al. |
| 2010/0027503 A1* | 2/2010 | Eravelli et al. ............... 370/331 |
| 2010/0061337 A1 | 3/2010 | Hallenstal et al. |
| 2010/0128649 A1* | 5/2010 | Gonsa et al. ............... 370/312 |
| 2010/0128696 A1* | 5/2010 | Fantini et al. ............... 370/331 |
| 2010/0157938 A1 | 6/2010 | Jin et al. |
| 2010/0178941 A1 | 7/2010 | Chun et al. |
| 2010/0246534 A1* | 9/2010 | Vargantwar et al. ........... 370/332 |
| 2010/0273486 A1 | 10/2010 | Kharia et al. |
| 2011/0007713 A1* | 1/2011 | Kobayashi ............... 370/332 |
| 2011/0051682 A1 | 3/2011 | Kampmann et al. |
| 2011/0164588 A1 | 7/2011 | Kwon et al. |
| 2012/0140734 A1* | 6/2012 | Arakawa ............... 370/331 |
| 2012/0170548 A1 | 7/2012 | Rajagopalan et al. |
| 2013/0107859 A1 | 5/2013 | Shi et al. |
| 2013/0136106 A1 | 5/2013 | Shetty et al. |
| 2013/0229976 A1 | 9/2013 | Srinivasan et al. |

FOREIGN PATENT DOCUMENTS

| | | |
|---|---|---|
| EP | 2095665 A1 | 9/2009 |
| EP | 2095673 A2 | 9/2009 |
| EP | 2253162 A1 | 11/2010 |
| WO | WO 02/19736 A2 | 3/2002 |
| WO | WO 2004/100452 A1 | 11/2004 |
| WO | WO 2006/078627 A2 | 7/2006 |
| WO | WO 2007/026267 A2 | 3/2007 |
| WO | WO 2008/057869 A1 | 5/2008 |
| WO | WO 2008/057874 A1 | 5/2008 |
| WO | WO 2008/057885 A2 | 5/2008 |
| WO | WO 2009/092008 A1 | 7/2009 |
| WO | WO 2013/131098 A1 | 9/2013 |

OTHER PUBLICATIONS

European Patent Application No. EP 07844768.7, Examination Report, 4 pages, Feb. 27, 2014.
European Patent Application No. EP 07863693.3, Examination Report, 4 pages, Feb. 26, 2014.
European Patent Application No. EP 07863704.8, Examination Report, 3 pages, Feb. 26, 2014.
European Patent Application No. EP 09702959.9, Examination Report, 7 pages, Feb. 6, 2013.
European Patent Application No. EP 09702959.9, Examination Report, 6 pages, Feb. 10, 2014.
International Application No. PCT/US2007/083114, International Preliminary Report on Patentability, 10 pages, Feb. 5, 2009.
International Application No. PCT/US2007/083114, International Search Report & Written Opinion, 7 pages, Apr. 9, 2008.
International Application No. PCT/US2007/083129, International Preliminary Report on Patentability, 10 pages, Feb. 6, 2009.
International Application No. PCT/US2007/083129, International Search Report & Written Opinion, 11 pages, Apr. 14, 2008.
International Application No. PCT/US2007/083158, International Preliminary Report on Patentability, 13 pages, Feb. 6, 2009.
International Application No. PCT/US2007/083158, International Search Report & Written Opinion, 11 pages, Apr. 14, 2008.
International Application No. PCT/US2009/031291, International Preliminary Report on Patentability, 11 pages, Apr. 16, 2010.
International Application No. PCT/US2009/031291, International Search Report & Written Opinion, 13 pages, Jun. 2, 2009.
International Application No. PCT/US2013/028922, International Search Report & Written Opinion, 19 pages, Jul. 26, 2013.
3rd Generation Partnership Project, "3GPP TR 23.893 V0.3.0," Technical Specification Group Services and Architecture, Feasibility Study on Multimedia Session Continuity, Stage 2, Release 8, 33 pages, Oct. 2007.
3rd Generation Partnership Project, "3GPP TS 23.206 V7.0.0," Technical Specification Group Services and System Aspects, Voice Call Continuity between Circuit Switched and IP Multimedia Subsystem, Stage 2, Release 7, 33 pages, Sep. 2006.
Office Action for U.S. Appl. No. 13/784,544 mailed Jun. 12, 2014.
Non-final Office Action mailed Apr. 7, 2015 for U.S. Appl. No. 12/354,640.

* cited by examiner

PROVIDING DATA TO A MOBILE APPLICATION ACCESSIBLE AT A MOBILE DEVICE VIA DIFFERENT NETWORK CONNECTIONS WITHOUT INTERRUPTION

CROSS-REFERENCE TO RELATED APPLICATIONS

This application claims the benefit of U.S. Provisional Patent Application No. 61/606,053 entitled "MOBILE BASED SEAMLESS CONNECTIVITY,", which was filed on Mar. 2, 2012, the contents of which are all incorporated by reference herein.

This application is related to U.S. patent application Ser. No. 13/784,544 entitled "MOBILE DEVICE WHICH HANDS OVER CONNECTIVITY FROM ONE NETWORK CONNECTION TO ANOTHER NETWORK CONNECTION WITHOUT INTERRUPTION IN APPLICATION DATA FLOW AND METHODS THEREFOR,", concurrently filed herewith, the contents of which are all incorporated by reference herein.

This application is related to U.S. patent application Ser. No. 11/929,376 entitled "SYSTEM, METHOD, AND COMPUTER-READABLE MEDIUM FOR USER EQUIPMENT MANAGING MULTIPLE RADIO NETWORKS FOR HANDOVER AND LOW-POWER OPERATIONS,", which was filed on Oct. 30, 2007, now U.S. Pat. No. 8,126,461, which claims the benefit of U.S. Provisional Patent Application No. 60/863,931 entitled "SYSTEM, METHOD, AND COMPUTER-READABLE MEDIUM FOR USER EQUIPMENT CONVERGENCE MANAGEMENT,", which was filed on Nov. 1, 2006, the contents of which are all incorporated by reference herein.

This application is related to U.S. patent application Ser. No. 11/929,066 entitled "SYSTEM, METHOD, AND COMPUTER-READABLE MEDIUM FOR SELECTING A NETWORK FOR CONNECTIVITY AND HANDOVER BASED ON APPLICATION REQUIREMENTS,", which was filed on Oct. 30, 2007, now U.S. Pat. No. 8,279,831, which claims the benefit of U.S. Provisional Patent Application No. 60/863,931 entitled "SYSTEM, METHOD, AND COMPUTER-READABLE MEDIUM FOR USER EQUIPMENT CONVERGENCE MANAGEMENT,", which was filed on Nov. 1, 2006, the contents of which are all incorporated by reference herein.

This application is related to U.S. patent application Ser. No. 11/929,231 entitled "SYSTEM, METHOD, AND COMPUTER-READABLE MEDIUM FOR USER EQUIPMENT DECISION-MAKING CRITERIA FOR CONNECTIVITY AND HANDOVER,", which was filed on Oct. 30, 2007, which claims the benefit of U.S. Provisional Patent Application No. 60/863,931 entitled "SYSTEM, METHOD, AND COMPUTER-READABLE MEDIUM FOR USER EQUIPMENT CONVERGENCE MANAGEMENT,", which was filed on Nov. 1, 2006, the contents of which are all incorporated by reference herein.

This application is related to U.S. patent application Ser. No. 12/354,640 entitled "CLIENT-BASED MULTIMODE HANDOVER IN COMMUNICATION SYSTEMS,", which was filed on Jan. 19, 2009, which claims the benefit of U.S. Provisional Patent Application No. 61/021,569 entitled "CLIENT-BASED MULTIMODE HANDOVER IN COMMUNICATION SYSTEMS,", which was filed on Jan. 16, 2008, the contents of which are all incorporated by reference herein.

BACKGROUND

Network operators/carriers have the will and the resources to fix the wireless network overload problem. However, the increased availability of applications only makes network congestion worse with constant signaling from the application to the application stores and/or websites.

In mobile or wireless networks, specifically, where access to the data channel is negotiated with each request after the radio has transitioned to the idle state, not only floods the network with requests potentially blocking other devices from network access (the control channel has limited bandwidth) but also holding the radio on for longer periods of time for data that is providing no useful value. This results in excess data transfer and shortening the already problematic battery life of mobile devices such as super phones, smartphones, tablets, laptops, and other wireless devices/clients.

As WiFi networks and services become more ubiquitous and accessible, in particular, accessible in both indoor and outdoor environments, integration and utilization by mobile devices is becoming a mechanism through which network operators can alleviate mobile traffic load when a secure and seamless experience for users can be provided. In some instances, LAN based networks such as WiFi networks and services can also be used as a mechanism to enhance mobile device performance when used in conjunction with cellular networks and connections.

DETAILED DESCRIPTION

Figure 1A:
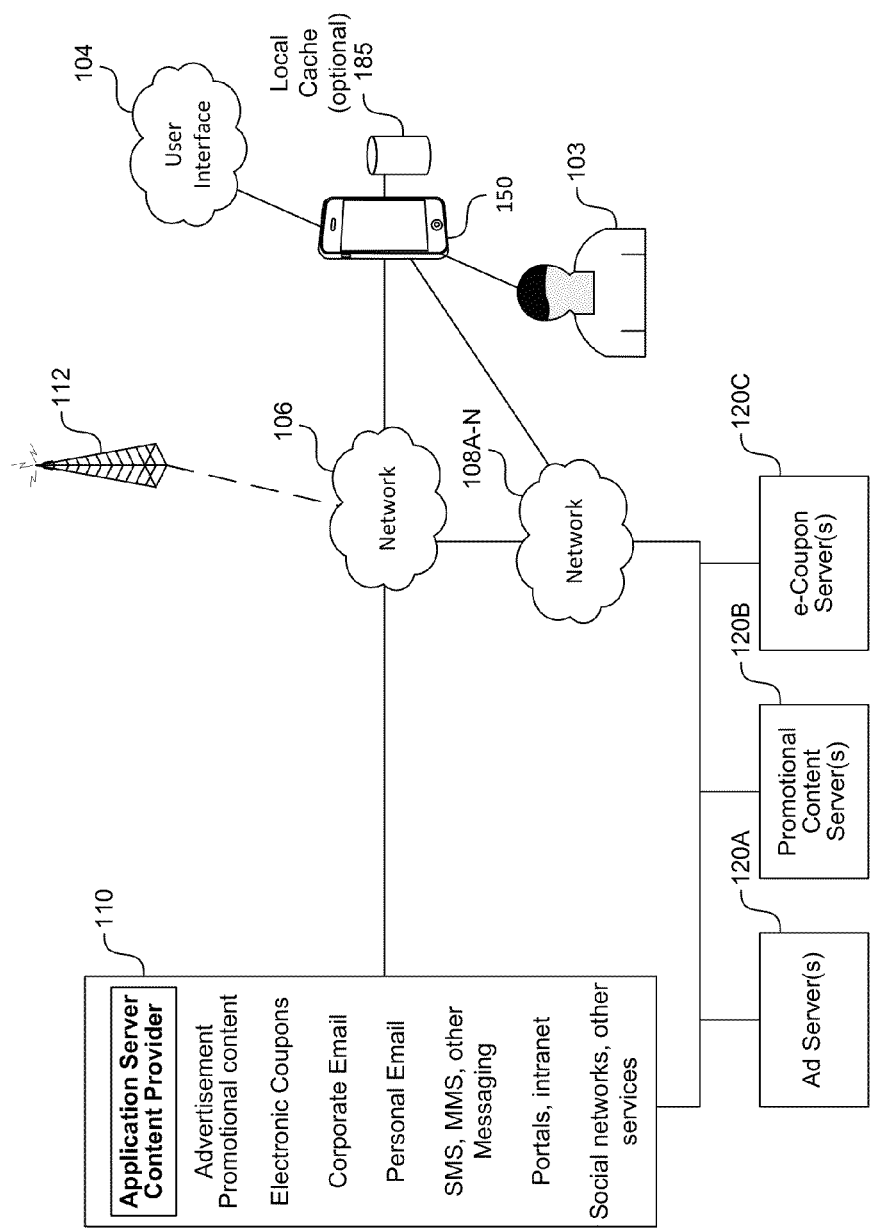
FIG. 1A illustrates an example diagram of a mobile device or system which can access different network connections (e.g., simultaneously or via handover) to conserve network and optimize network resources or to optimize and enhance application performance at a mobile device in communicating with remote entities such as a remote application server or content providers.

The following description and drawings are illustrative and are not to be construed as limiting. Numerous specific details are described to provide a thorough understanding of the disclosure. However, in certain instances, well-known or conventional details are not described in order to avoid obscuring the description. References to "one embodiment" or "an embodiment" in the present disclosure can be, but not necessarily are, references to the same embodiment and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Embodiments of the present disclosure include providing data to a mobile application accessible at a mobile device via different network connections without interruption.

There are multiple factors that contribute to the proliferation of data: the end-user, mobile devices, wireless devices, mobile applications, and the network. As mobile devices evolve, so do the various elements associated with them—availability, applications, user behavior, location thus changing the way the networks can interact with the device and the application.

Fortunately, smart devices or other mobile and portable devices now have multimode network capabilities. These devices are capable of communicating via different radio connections with different communication networks. Such networks include cellular networks (e.g. Global System for Mobile communication GSM, General Packet Radio Service GPRS, Code Division Multiple Access CDMA, Third Generation 3G, 3G+, 3.5G, WiMAX, LTE, 4G, etc.) or wireless broadband (e.g. Wireless Fidelity WiFi), WLAN. Multimode devices can communicate with different communication networks not only at the time a handover is conducted but also during normal operation to optimize connection parameters, e.g. maximize download bandwidth and speed, and thus improve user experience and performance.

One communication protocol on the Internet is Transmission Control Protocol TCP at Open System Interconnection OSI layer 4. Higher layer protocols, such as HTTP, SMTP, FTP (all OSI layer 7) use TCP directly. When a vertical handover occurs and the IP address is changed, a TCP session may break. This can cause an interruption in the data that goes from the communication network to an application running on a mobile device and result a disruption in the user experience. In other words, the application on the mobile interrupts and the user may realize this interruption.

Mobile IP can for example, operate by keeping maintaining the IP that is used between the end hosts' TCP session, and hence the application does not see a disruption. In Mobile IP the mobile device has a single home address. That is, when at home the mobile device uses the home address, and reaches the rest of the world using home address. When not at home, the mobile device registers with a Home Agent with the current local address called "care of address". To the rest of the world, the mobile device is reached at home address. The Home Agent routes packets to/from the mobile device from/to rest of the world (from home address to care of address). The protocol stacks on top of IP uses home address, even when mobile is elsewhere. Hence all TCP, RTP, SIP, HTTP, SSL, etc. upper layer protocols and applications are not aware of location change and do not need to be modified. Mobile IP has several drawbacks. For example a Home Agent, i.e. additional infrastructure, is required. From the user's standpoint, mobile IP generally requires a subscription with a network provider that may be costly The disclosed technology, in one embodiment provides a continued session for an application accessible via or on a mobile device, for example, in case of a handover between different networks, i.e. making the handover seamless or transparent for the application on the mobile device.

This can for example, be achieved by connecting the application on the mobile device to a communication network via an intermediate stage or interface (e.g., a local proxy, a network interface or a connectivity engine on the mobile device), the latter taking care of connection(s) to one or more communication networks. That is, the interface communicates with one or more communication networks which may change over time. In addition, the interface communicates with the application running on the mobile device. In case of a handover between one or more communication networks, the interface can manage the different network connection parameters, e.g. new IP address and an interrupted TCP connection. The communication between the interface and the application is preferably unchanged. For example, the interface and the application can communicate using TCP or UDP. In other words, the interface is an intermediate stage (e.g., a local proxy a network interface or a connectivity engine on the mobile device) between the application and the one or more communication network(s) and may provide one continuous session to the application even in case of one or more handovers.

The disclose technology, in one embodiment includes, a method for seamless handover from a first wireless connection to a second wireless connection. First data for an application is received from a first wireless connection by an interface. Second data for the application are received from a second wireless connection by the interface. Then the application is provided with a preferably continuous data flow from the interface based on the first and second data. The term continuous in this context means that a communication session, e.g. using a TCP connection, is not interrupted.

It is noted that the term "handover" can include a change from one connection to another connection and also include to hold a first connection and add a second or more connections, e.g. to increase and/or to maximize network or connection bandwidth to enhance performance.

The second data from the second wireless connection can be received at the time a handover from the first wireless connection to the second wireless connection is imminent or after the handover. According to one embodiment, the amount of the first data to be received via the first wireless connection before handover is determined. For example, the amount of data to be received via the first wireless connection can depend on the connection quality or bandwidth of the first and/or second wireless connection. The decision to handover can be dependent on the quality of both networks, with bandwidth of both networks being one of the factors. The amount of data that comes from the first network depends on how long the first network is used—how long the network is used is a function of when the handover occurs, which in turn can depend on the quality of the second network.

In one embodiment, the interface or network interface includes a connectivity engine, or a mobile seamless connectivity engine. The data between the interface and the application can include, for example, UDP or TCP, e.g. wherein source port and destination port remain constant in contrast to communication between the network interface and the application server.

The disclosed technology maintains the data stream going from the interface to the application requiring the data continuous during a handover, e.g. a vertical handover, also in case the IP address is changed. Hence, during the handover, there is no disruption in the data stream that goes to the application and the handover is "seamless" or generally continuous for the application.

FIG. 1A illustrates an example diagram of a mobile device 150 or system which can access different network connections 106 and/or networks 108A-N (e.g., simultaneously or via handover) to conserve network and optimize network resources or to optimize and enhance application performance at a mobile device in communicating with remote entities such as a remote application server or content providers 110.

Figure 1B:
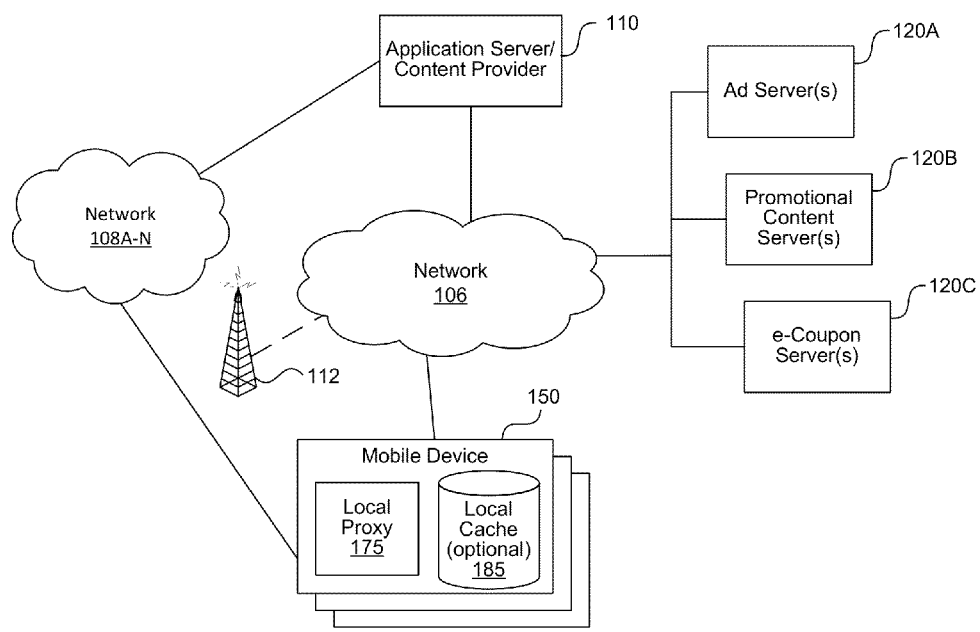
FIG. 1B illustrates another example diagram of a mobile device having a local proxy and an optional local cache, which facilitates access different network connections (e.g., simultaneously or via handover) to conserve network and optimize network resources or to optimize and enhance application performance at a mobile device in communicating with remote entities such as a remote application server or content providers.

FIG. 1B illustrates another example diagram of a mobile device 150 having a local proxy 175 and an optional local cache 185, which facilitates access different network connections (e.g., simultaneously or via handover) via multiple networks (e.g., network 106 and/or networks 108A-N) to conserve network and optimize network resources or to optimize and enhance application performance at the mobile device 150 in communicating with remote entities such as a remote application server or content providers 110 and/or 120A-N.

The mobile/client device 150 can be any system and/or device, and/or any combination of devices/systems that is able to establish a connection, including wired, wireless, cellular connections with another device, a server and/or other systems such as host server 100 and/or application server/content provider 110. Client/mobile device 150 will typically include a display and/or other output functionalities to present information and data exchanged between among the devices 150 and/or application server/content providers 110 and 120A-C. The application server/content provider 110 can by any server including third party servers or service/content providers further including advertisement, promotional content, publication, or electronic coupon servers or services. Similarly, separate advertisement servers 120A, promotional content servers 120B, and/or e-Coupon servers 120C as application servers or content providers are illustrated by way of example.

For example, the client/mobile device 150 can include mobile, hand held or portable devices, wireless devices, or non-portable devices and can be any of, but not limited to, a server desktop, a desktop computer, a computer cluster, or portable devices, including a notebook, a laptop computer, a handheld computer, a palmtop computer, a mobile phone, a cell phone, a smart phone, a PDA, a Blackberry device, a Palm device, any tablet, a phablet (a class of smart phones with larger screen sizes between a typical smart phone and tablet), a handheld tablet (e.g., an iPad, the Galaxy series, the Nexus series, the Kindles, Kindle Fires, any Android-based tablet, Windows-based tablet, Amazon-based, or any other tablet), any portable readers/reading devices, a hand held console, a hand held gaming device or console, a head mounted device, a head mounted display, a thin client (e.g., Chrome books) or any Super Phone such as the iPhone, and/or any other portable, mobile, hand held devices, or fixed wireless interface such as a M2M device, etc. In one embodiment, the client devices 150 (or mobile devices 150), and application server 110 are coupled via a network 106 and/or networks 108A-N.

The input mechanism on client devices 150 can include touch screen keypad (including single touch, multi-touch, gesture sensing in 2D or 3D, etc.), a physical keypad, a mouse, a pointer, a track pad, a stylus, a stylus detector/sensor/receptor, motion detector/sensor (e.g., including 1-axis, 2-axis, 3-axis accelerometer, etc.), a face detector/recognizer, a retinal detector/scanner, a light sensor, capacitance sensor, resistance sensor, temperature sensor, proximity sensor, a piezoelectric device, device orientation detector (e.g., electronic compass, tilt sensor, rotation sensor, gyroscope, accelerometer), or any combination of the above.

Signals received or detected indicating user activity at client devices 150 through one or more of the above input mechanism, or others, can be used in the disclosed technology in acquiring context awareness at the client device 150. Contextual data can be collected for use in managing multi-network situations at a mobile device 150, to optimize the use of multiple networks in view of the available device resources and available network resources, for example to determine whether it would be optimal to operate to enhance performance by utilizing multiple available networks or simply to perform a handover because one network is unavailable or inaccessible, or perform a handover because one network is preferential from a power consumption standpoint with respect to the other available networks given the device's current battery power level, etc.

Context awareness at client devices 150 generally includes, by way of example but not limitation, client device 150 operation or state acknowledgement, management, user activity/behavior/interaction awareness, detection, sensing, tracking, and/or application (e.g., mobile applications) type, behavior, activity, operating state, etc. Context awareness in the present disclosure also includes knowledge and detection of network side contextual data and can include network information such as network capacity, bandwidth, traffic, type of network/connectivity, and/or any other operational state data. Network side contextual data can be received from and/or queried from network service providers (e.g., cell provider 112 and/or Internet service providers) of the network 106 and/or network 108A-N (e.g., by the host server and/or devices 150). In addition to application context awareness as determined from the client 150 side, the application context awareness may also be received from or obtained/queried from the respective application/service providers 110 (by the host 100 and/or client devices 150) for use in determining appropriate handover situations when multiple networks are available.

Contextual information obtained for client/mobile devices 150, networks 106/108, applications (e.g., mobile applications), application server/provider 110, or any combination of the above, to manage the traffic in the system to satisfy data needs of the client devices 150 (e.g., to satisfy application or any other request including HTTP request). In one embodiment, the traffic is managed to satisfy data requests made in response to explicit or non-explicit user 103 requests and/or device/application maintenance tasks.

The traffic can be managed such that network consumption, for example, use of the cellular network is conserved for effective and efficient bandwidth utilization through handovers or effective utilization of multiple networks at a mobile device 150. In addition, the device 150 side resources (e.g., including but not limited to battery power consumption, radio use, processor/memory use) can be optimized with a general philosophy for resource conservation while still optimizing performance and user experience through the disclosed management of providing data to mobile applications utilizing different network connections and managing handover situations from one network to another network.

For example, in context of battery conservation, the device 150 can observe user activity (for example, by observing user keystrokes, backlight status, or other signals via one or more input mechanisms, etc.) and alters device 150 behaviors by selecting a network over another network which is less resource consuming. Alternatively, if the device 150 was connected to multiple networks, it can automatically disconnect or adjust the number of networks it was utilizing for the mobile applications to conserve battery power until the device battery is restored, for example.

In general, the networks 106 and/or 108A-N, over which the client devices 150, the host server 100, and/or application server 110 communicate, may be a cellular network, a broadband network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, UDP, HTTP, DNS, FTP, UPnP, NSF, ISDN, PDH, RS-232, SDH, SONET, etc.

The networks 106 and/or 108A-N can be any collection of distinct networks operating wholly or partially in conjunction to provide connectivity to the client devices 150 and may appear as one or more networks to the serviced systems and devices. In one embodiment, communications to and from the client devices 150 can be achieved by, an open network, such as the Internet, or a private network, broadband network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), or any broadband network, and further enabled with technologies such as, by way of example, Global System for Mobile Communications (GSM), Personal Communications Service (PCS), Bluetooth, WiFi, Fixed Wireless Data, 2G, 2.5G, 3G (e.g., WCDMA/UMTS based 3G networks), 4G, IMT-Advanced, pre-4G, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, HSPA+, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks, broadband networks, or messaging protocols.

Figure 2A:
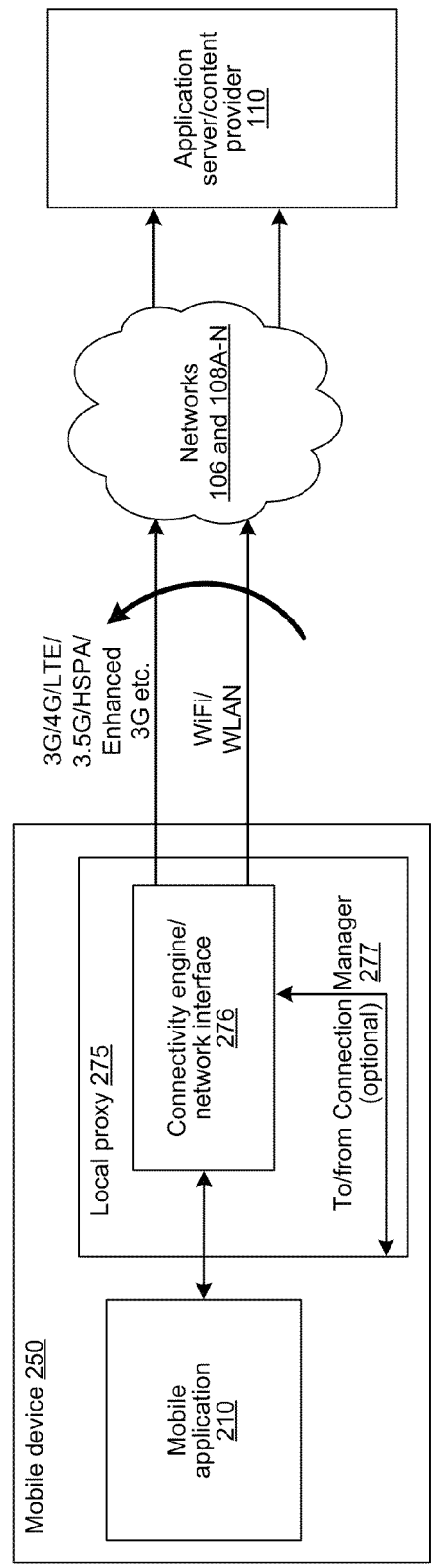
FIG. 2A depicts a diagram illustrating a mobile device having a connectivity engine to facilitate connection management between a cellular and a LAN-based (e.g., WLAN, WIFI) connection to service an application on the mobile device, for instance, a change in connection from a WIFI or similar connection to a cellular-based connection.

FIG. 2A depicts a diagram illustrating a mobile device 250 having a connectivity engine 276 to facilitate connection management between a cellular and a LAN-based (e.g., WLAN, WIFI) connection or any other networks e.g., networks 106 or 108A-N) to service an application 210 on the mobile device, for instance, a change in connection from a WIFI or similar connection to a cellular-based connection.

The mobile device 250, in one embodiment includes a local proxy having a connectivity engine 276 (e.g., a Mobile Seamless Connectivity Engine (MSCE)) as an interface/network interface or intermediate stage between different communication networks and the mobile application 210 with a respective application server/content provider 110. The local proxy 275 or the connectivity engine/network interface 276 communicates, i.e. receives and/or sends data, with the mobile application 210. Further, the connectivity engine/network interface 276 can be coupled to a connection manager, e.g. controlling the network connections and detecting and/or managing handovers.

In one example, the mobile device 250 can be connected to the Internet to one of the application servers/content providers 110, e.g. CNN, Youtube etc. In one example, the mobile device 250 can be initially connected to a LAN (e.g., WLAN-based network, e.g., the WiFi network) and then to a cellular network (e.g., 3G, enhanced 3G, LTE, or other mobile network). For example, if the user changes from an area covered by WiFi to an area only covered by cellular network), or if the user moves from an area with better Wifi coverage than cellular coverage (e.g., indoors vs. outdoors), the mobile device may initially preferentially use WiFi connection.

In addition, if the mobile operator, user, or device determines that the user has exceeded or is near exceeding data usage, the device can preferentially automatically select to initially use a LAN based network when available or when certain criteria is met (e.g., when the requested content is resource intensive, etc. such as involving media transmission or downloads or uploads of large content files).

At the point where a cellular or mobile network (e.g., 3G, LTE, 4G or other mobile connection is available, necessary, or otherwise requested by the user or allowed by the carrier), the mobile device 250 can still selectively use WiFi and/or the mobile network. In an example where the mobile device 250 leaves an area covered by WiFi the mobile device uses the 3G connection. At any stage, the local proxy 275 or the connectivity engine 376 (e.g., or the Mobile Seamless Connectivity Engine) provides the application 210 accessed or on the mobile device 250 with data in a continuous or near continuous session, in a manner that is uninterrupted or otherwise that does not disrupt user experience or otherwise undetectable by a user, i.e. the communication or operation between the local proxy 275 having the connectivity engine/network interface 276 and the mobile application 210 is not affected by switching connections among communication networks or utilizing multiple communication networks 106 and/or 108A-N.

Figure 2B:
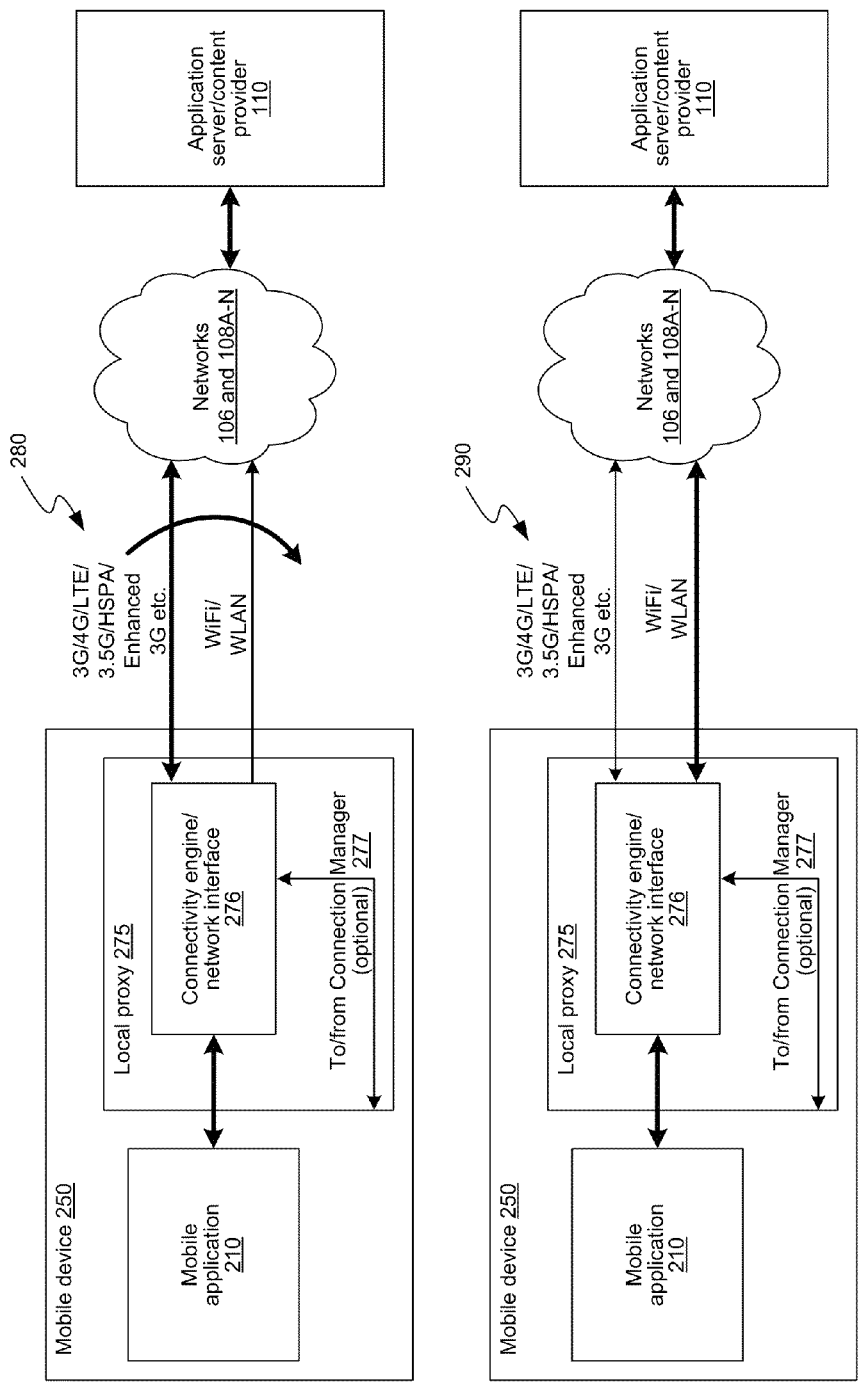
FIG. 2B depicts a diagram illustrating a mobile device having a connectivity engine to facilitate connection management between a cellular and a LAN-based (e.g., WLAN, WIFI) connection to service an application on the mobile device, for instance, a handover from a cellular/mobile connection to a LAN-based (WLAN or WIFI) or similar connection).

FIG. 2B depicts a diagram illustrating a mobile device 250 having a connectivity engine/network interface 276 in a local proxy 275 to facilitate connection management between a cellular and a LAN-based (e.g., WLAN, WIFI) connection among multiple networks 106 and/or 108A-N to service an application 210 on the mobile device 210, for instance, a handover from a cellular/mobile connection to a LAN-based (WLAN or WIFI) or similar connection).

For instance, in diagram 280, the mobile device 250 communicates via a cellular network (e.g., 3G) and in diagram 290, via a WLAN (e.g., Wifi) network. When a handover from, for example, 3G to WiFi occurs (e.g. a "vertical handover"), the connectivity engine/network interface 276 in the local proxy 275 (e.g., or the Mobile Seamless Connectivity Engine MSCE) starts a TCP connection using a new network connection with the server. At the time the handover is performed the data may not be completely downloaded by the mobile device 250, e.g. due to a download not yet completed or an ongoing data transfer like a video telephone call.

For example, while a Youtube video is being downloaded handover occurs. In such a case the connectivity engine/network interface 276 in the local proxy 275 (e.g., or the Mobile Seamless Connectivity Engine) may requests the server to send the data that the application has not yet received, i.e. the remaining video data. That is, in case an object is not yet completed, the connectivity engine/network interface 276 in the local proxy 275 (e.g., or the Mobile Seamless Connectivity Engine) can retrieve, download, or receive the remainder of the object from the application server/content provider 110. It is noted that while the connection from the connectivity engine/network interface 276 in the local proxy 275 (e.g., or the Mobile Seamless Connectivity Engine) to the Internet is changed from 3G to WiFi, the connection from the connectivity engine/network interface 276 in the local proxy 275 (e.g., or the Mobile Seamless Connectivity Engine) to the application 210 remains unchanged.

In other words, to the mobile application 210, the change in network connections, e.g. from 3G to WiFi, is transparent (e.g., not visible or detectable). To the application server/content provider 110, a new TCP session has started with a new client. At the application level, the application server 110 can note that the same application 210 has requested the remainder of the object. The local proxy 275 or the connectivity engine/network interface 276 (e.g., or the Mobile Seamless Connectivity Engine) can anchor the "socket" session to the client application so that the IP address change or change in other protocol identifier is transparent or un-detectable by the mobile application 210 and/or the user of the mobile application 210.

Figure 3:
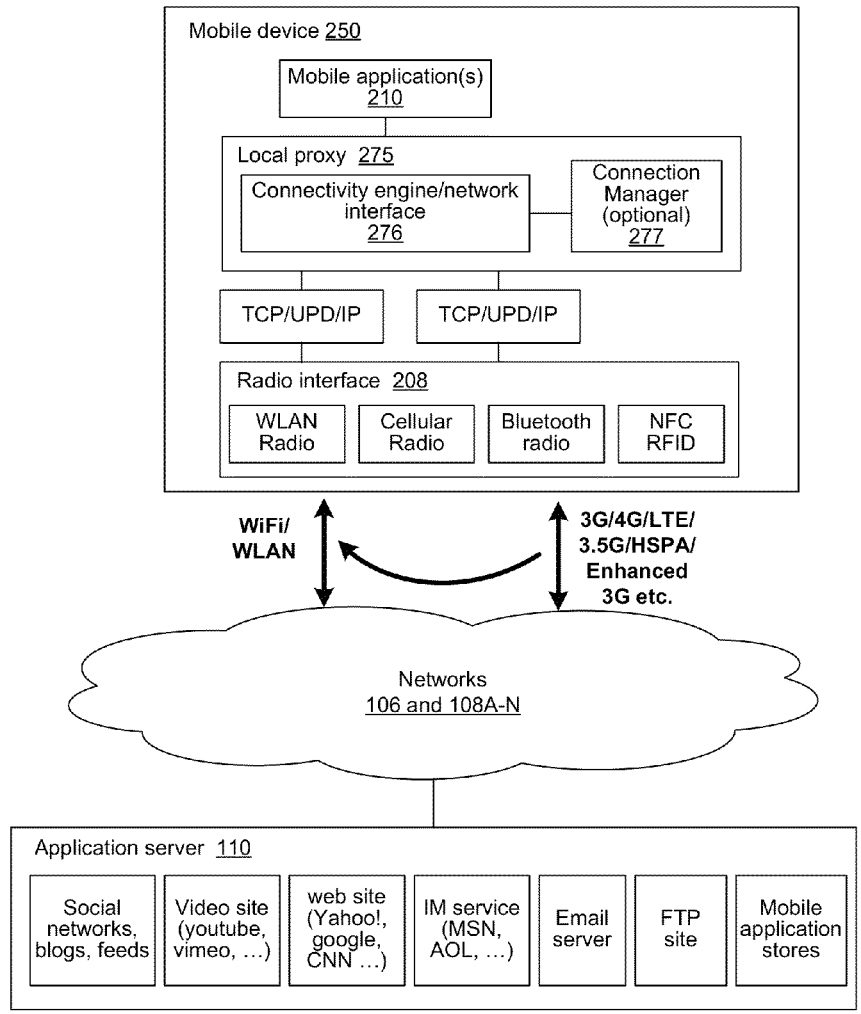
FIG. 3 depicts a block diagram illustrating an example of components of the mobile device including local proxy having a connectivity engine able to provide data to a mobile application via different and multiple network connections without interruption and/or able to hand over connectivity from one network connection to another network connection.

FIG. 3 depicts a block diagram illustrating an example of components of the mobile device including local proxy having a connectivity engine able to provide data to a mobile application via different and multiple network connections without interruption and/or is able to hand over connectivity from one network connection to another network connection.

The mobile device 250 includes either accessible or installed there on multiple applications 210, a local proxy 275 having a connectivity engine/network interface 276 (e.g., a mobile seamless connectivity engine). The local proxy 275 may also include a connection manager 277. The mobile device 250 also includes a processor, a memory and multiple radios each operable to connect to one or more networks and also coupled to the connectivity engine/network interface 276.

In one embodiment, the radios are included in a radio interface 208 and can include, one or more of, a cellular radio, a Bluetooth radio, a WiFi or WLAN radio interface. In one embodiment, the mobile device 250 also includes an RFID based near-field communication chip.

The local proxy 275 or the connectivity engine/network interface 276 (e.g., or the Mobile Seamless Connectivity Engine) can be intermediate stage or interface between the networks 106 and/or 108A-N and the mobile application(s) 210 on the mobile device 250. The mobile device 210 can communicate with any application server 110, e.g. for retrieving video sites (e.g., social networking sites, blogs feeds, youtube, vimeo, etc.), web sites (Yahoo!, Google, CNN, etc.), IM service (MSN, AOL, etc.), Email service, FTP site, App stores, etc. Hence, the mobile applications 210 accessed via or executed on the mobile device may be any program, e.g. a video player, an internet browser, voice over IP application, e-mail program.

In one embodiment, a radio of the radio interface 208 is disconnected before the other radio of the radio interface 208 is connected; and, the network interface 276 of the local proxy 275 determines an amount of the additional data to be downloaded for continuous receipt by the application 210. In one embodiment, the other radio of the radio interface 208 is connected before the radio in the radio interface 208 is disconnected; and, the network interface 276 of the local proxy 275 determines an amount of the additional data to be downloaded for continuous receipt by the application 210.

In general, the mobile device 250 is able to service the application 210 using data received via one of the radios in the radio interface 208 connected to a network of the networks 106 and 108A-N and further service the application 210 using additional data received using the radio or another radio in the radio interface 208 connected to a different network among the networks 106 and 108A-N, such that the data and the additional data is received by the application 210 continuously. In one embodiment, the data and the additional data is received by the application continuously even when the different network causes a new TCP session to be established, or even when connections to the different network connections require change in IP addresses.

Specifically, for example, during operation, when the network connection is made over a LAN-based network connection at the mobile device 250, the mobile device 250 retrieves or receives the data, e.g. a video or other multimedia data file, and the mobile application can perform playbeack plays it. In one embodiment, the local proxy 275 or the connectivity engine/network interface 276 can provide socket service to the mobile application and forwards the received data to the video application. In addition, the local proxy 275 or the connectivity engine/network interface 276 (e.g., or the Mobile Seamless Connectivity Engine) can forward data content to the mobile application 210. If and when the network connection changes from one network to another (e.g., from WLAN/WIFI to mobile/cellular, in other words, there is a handover of the network connection).

In one embodiment, the handover occurs by breaking the first network connection then the second connection is established, otherwise referred to as "break-then-make." When the first network connection (e.g., the LAN-based or WIFI connection) is broken, the local proxy 275 or the connectivity engine/network interface 276 can be informed, e.g. by the connection manager 277, of the disconnection. The local proxy 275 or the connectivity engine/network interface 276 (e.g., or the Mobile Seamless Connectivity Engine) can also, in one embodiment, automatically detect the disconnection or unavailability of the first network connection.

The local proxy 275 or the connectivity engine/network interface 276 can further determine, compute, or extract where the disconnection point is in the data, content or media stream. When the new connection is made, in one case, for example, to a cellular network, the connection manager 277 can inform the local proxy 275 or the connectivity engine/network interface 276 (e.g., or the Mobile Seamless Connectivity Engine) that a new connection or network is available.

The local proxy 275 or the connectivity engine/network interface 276 (e.g., or the Mobile Seamless Connectivity Engine) can request and/or retrieve the remainder of the data and/or content (e.g., any media, multimedia content) from the application server 110. When the video data arrives on the new connection, the local proxy 275 or the connectivity engine/network interface 276 provides the data or content back to the mobile application(s) 210 (e.g. video application). The local proxy 275 or the connectivity engine/network interface 276 ensures that the "new" data ensures consistency with the data already received from the previous connection (e.g., via the LAN-based network), at or near the point where it was last received. As the new data is provided to the video application, the mobile application 210 can continue receipt of the video without knowledge that a handover has just occurred from one network to another (e.g., a WLAN based network to a cellular based network).

In essence, the mobile application and any other application 210 on the mobile device 250 can be serviced using a first data set for the application 210 from one network connection and a second data set for the application from the other network connection, such that the first and second data sets are is received by the application 210 continuously during any hand over from one network to another without interruption to the mobile application, without interruption in the user experience, or detectable change in operation in user experience when there is any change in network connectivity at the mobile device 250.

In one embodiment, the local proxy 275 or the connectivity engine/network interface 276 can predict or anticipate that a currently connected network connection may not be available or may soon become disconnected for one reason or another (e.g., by way of carrier/network operator policy, proximity to towers, geography, location information, time of day, discovery of other networks, user preference, data usage, data plan, device type, device limitations, etc.). This information can be used to "pre-fetch" some of the data in anticipation or prediction of a handover or availability of another network.

In such situations, and in view of such predication or anticipation that a network connection may soon be no longer available or may be disconnected the local proxy 275 or the connectivity engine/network interface 276 (e.g., or the Mobile Seamless Connectivity Engine) can manage a make-then-break handover, in other words, establish a second connection before the current connection is disconnected. The local proxy 275 or the connectivity engine/network interface 276 can connect with the application server 110 when it predicts, anticipates or determines that a change in network connection or handover can or will occur in the near future or is already imminent. The connectivity engine/network interface 276 can determine or estimate an amount of data to be accessed and/or retrieved and can request the amount of the needed data/content over the second network interface. Once the new content is received or retrieved, the local proxy 275 or the connectivity engine/network interface 276 can provide the data/content to the application at an exact or near exact point where the data or content from the previous connection leaves off. The local proxy 275 can also retrieve or download partially overlapping content or data to ensure data is provided to the mobile application 210 without gaps or otherwise in a manner that is without noticeable interruption either to the application 210 and/or to a user.

In one embodiment, the local proxy 275 or the connectivity engine/network interface 276 utilizes that some communication protocols such as the HTTP protocol allows objects to be partially retrieved. For example, if a content portion (e.g., a portion of a media file) has been downloaded or retrieved by the mobile device 250, the remaining part of the content portion can be retrieved by partial retrieval. This can be performed by, for example, the HTTP GET request using the RANGE field to specify the data to be downloaded. The partial GET method, for example, can reduce unnecessary network usage by allowing partially received content continued in part or in whole without transferring the data already received by the mobile device 250.

Using partial retrieval, any object or data/content whose download or retrieval process is disrupted by a network change, handover or add of an additional network, can continue to be retrieved or downloaded on the new or added network. Since the local proxy 275 or the connectivity engine/network interface 276 provides a socket service (stream or datagrams) to the mobile application 210, the local proxy 275 or the connectivity engine/network interface 276 (e.g., or the Mobile Seamless Connectivity Engine) can track, determine, monitor, or estimate an amount of data that has been retrieved, and the local proxy 275 or the connectivity engine/network interface 276 can perform a partial retrieval (e.g., partial GET) for the needed amount of data to ensure uninterrupted servicing of the mobile application 210 by the application server 110 and/or to ensure user experience with the mobile application 210 in the event of the handover or with the addition of networks and/or with utilization of multiple networks 106 and/or 108A-N at overlapping or partially overlapping periods of time.

As the needed or remaining data is retrieved over the new connection or new network, the local proxy 275 or the connectivity engine/network interface 276 can provide to the mobile application 210 the needed data, and the application is not aware of the disruption in the network connection. Note that the mobile device 250 includes multiple mobile applications 210 and for each of the multiple applications 210 continuous data flow to each of the multiple applications during the hand over is ensured in a similar fashion. The multiple applications can be identified into different application classes by the local proxy 275 or the connectivity engine/network interface 276. Furthermore, a given application class can be associated with a relay based on a protocol utilized by the application class, and the relay provides the continuous data for to each of the other applications in the application class on the mobile device 250.

In one example, a video application allows the handover to occur seamlessly using the disclosed technology described above. For instance, video or media applications typically buffer video data and delays playback so that interruptions in the download do not disturb continuous playback to the user. However, using the disclosed make-then-break method, the local proxy 275 or the connectivity engine/network interface 276 (e.g., or the Mobile Seamless Connectivity Engine) can continue video download or other media retrieval or playback with virtually no disruption.

The local proxy 275 or the connectivity engine/network interface 276 (e.g., or the Mobile Seamless Connectivity Engine) can also make general web browser experience seamless and without interruption to the user during vertical handovers or when network connections change from one connection to another, or when multiple networks are utilized at a mobile device 250. For instance, a web page is made up of a large number of objects, where each can be identified by the universal resource identifier (URI). During the downloading of the web objects and the rendering of the web page to the user, multiple objects may be simultaneously retrieved by the mobile host.

The local proxy 275 or the connectivity engine/network interface 276 (e.g., or the Mobile Seamless Connectivity Engine) can make the web page downloading seamless, continuous, or otherwise uninterrupted to the user during a handover by resuming the downloading of any objects that were interrupted during the handover. The local proxy 275 or the connectivity engine/network interface 276 (e.g., or the Mobile Seamless Connectivity Engine) would make use of GET or partial GET of those objects that were only partially downloaded before the handover.

In one embodiment, the local proxy 275 or the connectivity engine/network interface 276 (e.g., or the Mobile Seamless Connectivity Engine) has the option of not resuming interrupted downloaded objects, if the local proxy 275 or the connectivity engine/network interface 276 determines that the object is not of sufficient importance.

The local proxy 275 or the connectivity engine/network interface 276 (e.g., or the Mobile Seamless Connectivity Engine) can also coordinate with the connection manager 277 so that objects being downloaded on the previous or first connection are continued until completion, and that new or newer objects are downloaded on the new or added connections or networks. This can be applied if the current or previous connection is able to offer enough bandwidth to continue retrieval current or old objects. With such a method, for example, the local proxy 275 or the connectivity engine/network interface 276 (e.g., or the Mobile Seamless Connectivity Engine) coordinates with the connection manager to know of the connection quality on the old and new network connections.

From the application standpoint, objects are passed from the local proxy 275 or the connectivity engine/network interface 276 (e.g., or the Mobile Seamless Connectivity Engine), and the change in connection/network or addition of a network or utilization of multiple networks is not apparent to the application 210, i.e. the change is transparent to the application 210. In addition, the connectivity engine/network interface 276 manages object downloads, or retrievals of web objects in a manner that is transparent to a user, such that user experience is not affected or otherwise undetectable by a user when the network connections are changed from one network connection to another or when multiple and/or different networks are utilized to provide data to mobile applications 210 at the mobile device 250.

The disclosed technology can be applied to any application and application-level protocol that supports partial retrievals, for example HTTP, FTP, SMTP, POP, IM. The disclosed embodiments can also include any application and application-level protocol that supports partial uploading, for example HTTP, FTP, and email protocols. Live/non-live and real-time, near-real time, non-real time streaming applications and protocols are supported because session continuation is inherent in a live session (e.g., RTP, RTCP protocols). For example, when a streaming session (e.g., live or non-live) is interrupted on an existing connection, the streaming session content can be moved to the a new network and continued to be downloaded from the new network. In a situation where a make-then-break method can be used, the streaming session can be switched with little or no disruption. In the case of break-then-make, the streaming session may experience a momentary disruption when the connection to the network (e.g., WIFI or Internet) is not available.

The local proxy 275 or the connectivity engine/network interface 276 (e.g., or the Mobile Seamless Connectivity Engine) can also be used to enhance the speed of the reception of an object when multiple connections (e.g., cellular and LAN/WIFI/WLAN/WIMAX, etc.) are available. When the application requests an object, the local proxy 275 or the connectivity engine/network interface 276 can retrieve different parts of the object on one or more of the available network connections. The amount of the object retrieved on each of the network interfaces depends on its connection quality, which can be determined by the connection manager.

When the data is retrieved, the local proxy 275 or the connectivity engine/network interface 276 sends the data to the application 210 in one stream, and the application uses the data without knowing that the data came from multiple connections. That is, different parts of an object are received via different network connections, e.g. WiFi and cellular data such as LTE, 4G or 3G, and can be assembled to one stream which is provided to the application 210. The assembling step may comprise bringing the data in a certain order, e.g. in case of video data. This feature can allow objects to be retrieved faster and enhances user experience and can in some instances, minimize data load of cellular of data providers if content can be retrieved from both LAN-based connections and cellular networks and aggregated to be provided to a mobile application 210.

In one embodiment, the local proxy 275 or the connectivity engine/network interface 276 is operable to aggregate data received from the radios and provide the data from the radios to the application(s) 210 in a continuous fashion. Furthermore, the local proxy 275 or the connectivity engine/network interface 276 is generally operable to aggregate data received over at least two of the one or more networks 106 and 108A-N to expedite data retrieval for the application(s) 210 on the mobile device 210.

Figure 4:
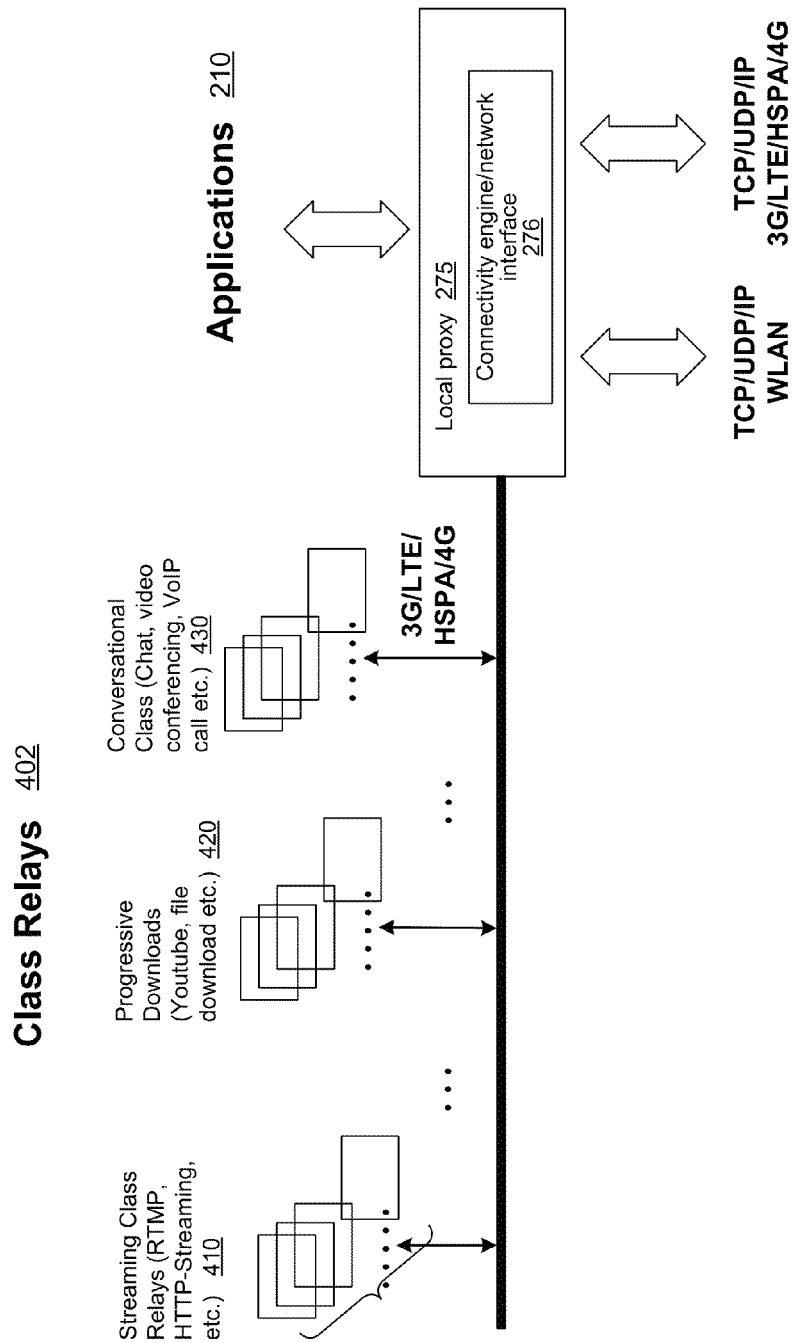
FIG. 4 depicts a diagram illustrating the association of relays with different applications by the connectivity engine to manage different protocols such that data flow to different applications utilizing different protocols can be serviced continuously.

FIG. 4 depicts a diagram illustrating the association of relays with different applications by the connectivity engine to manage different protocols such that data flow to different applications utilizing different protocols can be serviced continuously.

The local proxy 275 or the connectivity engine/network interface 276 is capable of separating the types of applications into application classes, and to deploy one or more Relays, e.g. one for each application class. In addition, The local proxy 275 or the connectivity engine/network interface 276 can use one or more relays to monitor one or more socket and to coordinate handovers. Relays, in one embodiment monitor socket traffic to determine the status of the download or retrieval. During handovers, for example, the relays can coordinate the transfer of the data from one network to another. The coordination is optionally conducted via the connection manager 277.

For each socket, the local proxy 275 or the connectivity engine/network interface 276 can, for example, monitor its content to determine what is communicated within each socket. To do this, the local proxy 275 or the connectivity engine/network interface 276 identifies the application-layer protocol that is used, for example, HTTP or FTP. Thus, the local proxy 275 or the connectivity engine/network interface 276 can provide a handover solution that is application-protocol based. The application classes are shown in 402 and can include by way of example:

File Transfer
Web Browsing
Progressive Download
Live, real time, or near real time Streaming, non-live streaming
E-mail
Instant Messaging (IM)

Each socket can be assigned to an Application-Class Relay, depending on the protocol used on that relay. When no handover occurs, each socket connects, communicates, then terminates, according to the application using the socket. The relay does not have to do anything. The local proxy 275 or the connectivity engine/network interface 276 performs typical socket functions. When a handover or change in network connection occurs, the relay can determine the status of the communication(s) on the socket. For each relevant socket, the relay can open a new connection on the new interface with the remote application server 110, and keeps open the socket to the local application on the mobile device. In addition, if the communication of an object was interrupted (e.g. downloading a video file), the relay can request the remainder of the content from the application server 110.

Figure 5:
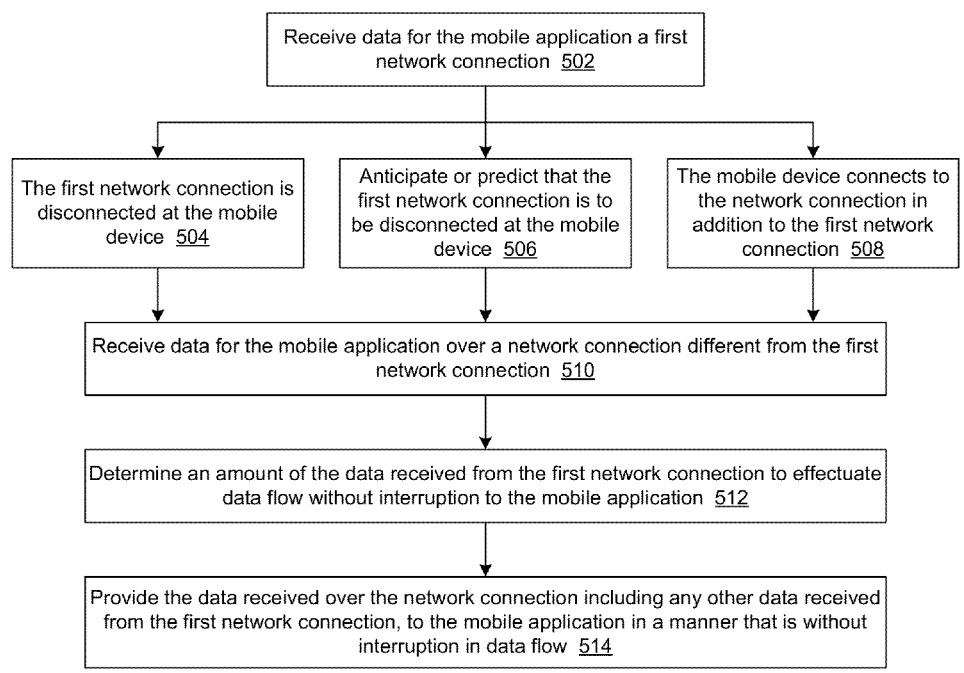
FIG. 5 illustrates a flow chart showing an example flow for providing data to a mobile application accessible at a mobile device via different network connections without interruption.

FIG. 5 illustrates a flow chart showing an example flow for providing data to a mobile application accessible at a mobile device via different network connections without interruption.

In process 502, data for the mobile application a first network connection is received. In process 510, data for the mobile application is received over a network connection different from the first network connection. The first network can be connected to at the mobile device to increase bandwidth or enhance bandwidth to optimize performance, for example. This can occur in response to, for example, in process 504, the first network connection is disconnected at the mobile device, or, in process 506, anticipate or predict that the first network connection is to be disconnected at the mobile device, and/or in process 508, the mobile device connects to the network connection in addition to the first network connection.

In general, the network connection and the first network connection are accessible to the mobile device at overlapping or partially overlapping periods of time. Furthermore, any different network connection parameters utilized by the first network connection and the first network connection are typically transparent to the mobile application.

In process 512, an amount of the data received from the first network connection to effectuate data flow without interruption to the mobile application can be determined.

In process 514, the data received over the network connection including any other data received from the first network connection, is provided to the mobile application in a manner that is without interruption in data flow. In one embodiment, the network connection is a cellular connection including one or more of 2G, EDGE, 3G, 3.5G, HSPA, 4G or LTE connection and the first network connection includes a WIFI or WiMax connection. In one embodiment, the network connection is a 3G connection and the first network connection is a 4G or LTE connection. Note that in general, the data is provided to the mobile application without interruption even when connections to the different network connections require change in IP addresses, or other types of identifiers.

Figure 6:
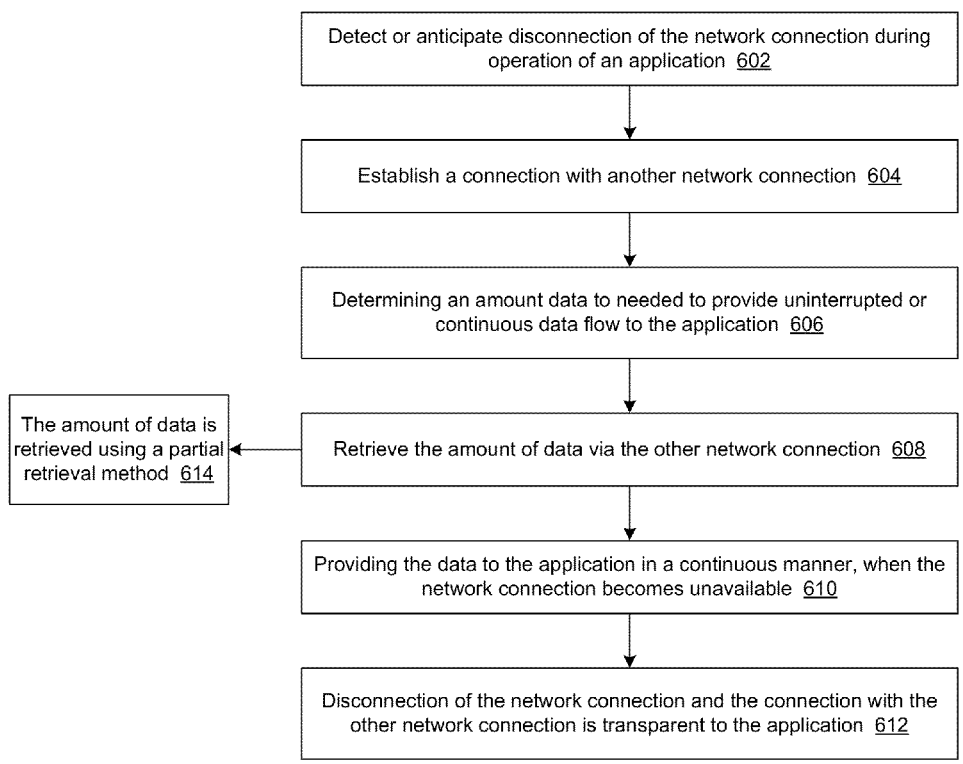
FIG. 6 illustrates a flow chart showing an example flow for continuously delivering data to an application when a network connection becomes unavailable.

FIG. 6 illustrates a flow chart showing an example flow for continuously delivering data to an application when a network connection becomes unavailable.

In process 602, disconnection of the network connection during operation of an application is detected or anticipated. In process 604, a connection with another network connection is established. In process 606, an amount data to needed to provide uninterrupted or continuous data flow to the application is determined. Note that in one embodiment, the amount of data is retrieved using a partial retrieval method, as in process 614. The partial retrieval method can include by way of example but not limitation, an HTTP GET request via the RANGE field. The partial retrieval method can also include one or more of, FTP, POP, IM, or streaming application such as RTP or RTCP protocol.

In process 608, the amount of data is retrieved via the other network connection. In process 610, the data is provided to the application in a continuous manner, when the network connection becomes unavailable such that the disconnection of the network connection and the connection with the other network connection is transparent to the application in process 612. Note that the network connection and the other network connection can be accessible to the mobile device at overlapping or partially overlapping periods of time; the network connection and the other first network connection may not be accessible to the mobile device at overlapping periods of time for continuous data flow to the application to be effectuated. The data can be provided to the mobile application without interruption even when connections to the different network connections require change in IP addresses.

Figure 7:
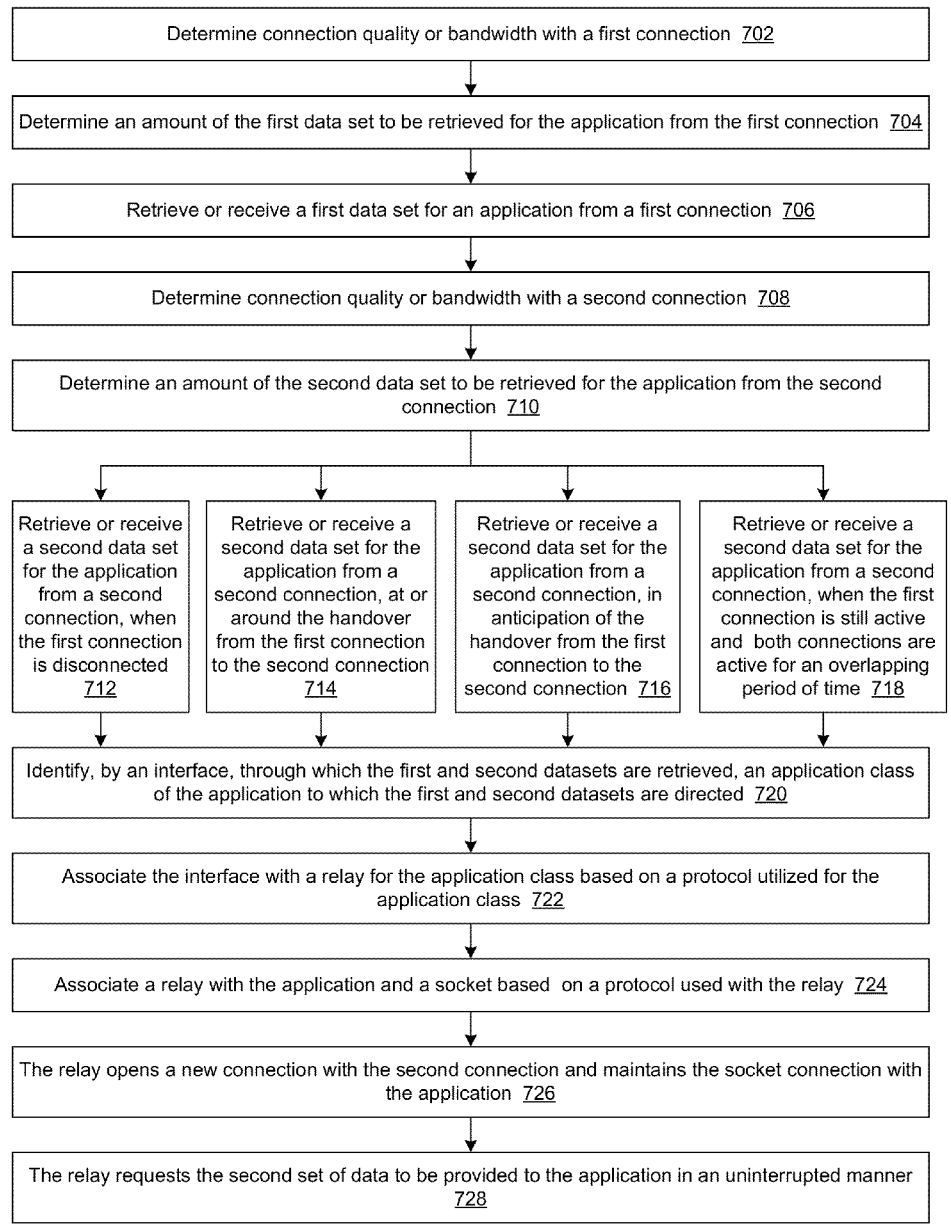
FIG. 7 illustrates a flow chart of handover from one connection to a second connection at a mobile device which provides an application at the mobile device with continuous data flow.

FIG. 7 illustrates a flow chart of handover from one connection to a second connection at a mobile device which provides an application at the mobile device with continuous data flow.

In process 702, a connection quality or bandwidth with a first connection is determined. In process 704, an amount of the first data set to be retrieved for the application from the first connection is determined. In process 706, a first data set for an application is retrieved or received from a first connection. In process 708, connection quality or bandwidth with a second connection In process 710, an amount of the second data set to be retrieved for the application from the second connection is determined. In one embodiment, a second data set is retrieved or received for the application from a second connection, when the first connection is disconnected, as in process 712. In one embodiment, a second data set for the application is retrieved or received from a second connection, at or around the handover from the first connection to the second connection, as in process 714.

In one embodiment, a second data set for the application is retrieved or received from a second connection, in anticipation of the handover from the first connection to the second connection as in process 716. In one embodiment, a second data set for the application is retrieved or received from a second connection, when the first connection is still active and both connections are active for an overlapping period of time, as in process 718. In process 720, an application class to which the first and second datasets are directed is identified by an interface through which the first and second data sets are retrieved.

In process 722, the interface is associated with a relay for the application class based on a protocol utilized for the application class. In process 724, a relay is associated with the application and a socket based on a protocol used with the relay. In one embodiment, the relay is generally implemented specifically for the protocol such that multiple different communication protocols are compatible with the disclosed technology. Therefore, different application classes are associated with different relays based on the utilized communication protocol. In process 726, the relay opens a new connection with the second connection and maintains the socket connection with the application. In process 728, the relay requests the second set of data to be provided to the application in an uninterrupted manner and the application can be provided with a continuous data flow using the first and second data sets. In one embodiment, the continuous data flow is provided to the application in a TCP session or as UDP data.

Figure 8:
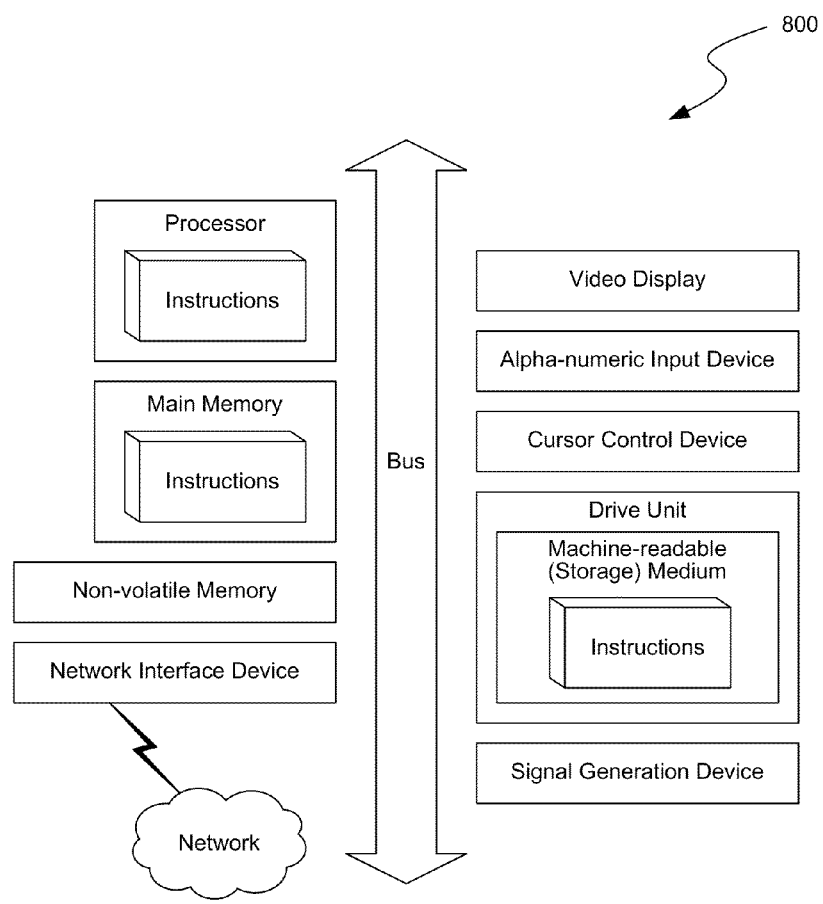
FIG. 8 shows a diagrammatic representation of a machine in the example form of a computer system within which a set of instructions, for causing the machine to perform any one or more of the methodologies discussed herein, may be executed.

FIG. 8 shows a diagrammatic representation of a machine in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. ¶112, ¶6 will begin with the words "means for.") Accordingly, the applicant reserves the right to add additional claims after filing the application to pursue such additional claim forms for other aspects of the disclosure.

What is claimed is:

1. A method of providing data to a plurality of mobile applications accessible at a mobile device via multiple different network connections without interruption, the method comprising:
   receiving, by a connectivity engine of the mobile device, data for a first and a second mobile application over a second network connection different than a first network connection;
   anticipating that the first network connection is to be disconnected;
   in response to anticipating that the first network connection is to be disconnected:
      determining an amount of data to be received from the first network connection to provide a first mobile application with continuous data flow when connecting to the second network connection; and
      determining an amount of data to be received from the first network connection to provide a second mobile application with continuous data flow when connecting to the second network connection; and
   providing the determined amount of data received over the second network connection after providing, data received by the connectivity engine from the first network connection to the first mobile application and the second mobile application in a continuous data flow without interruption;
   wherein the amount of the data received for the first mobile application and the second mobile application from the first network connection is determined based on connection quality or bandwidth of the second network connection or the first network connection;
   wherein the connectivity engine anchors the continuous data flow such that different network connection parameters utilized by the second network connection and the first network connection are not visible to or detectable by the mobile application.

2. The method of claim 1, wherein, the data is provided to the first mobile application and the second mobile application without interruption even when the second network connection or the first network connections requires a change in IP address.

3. The method of claim 1, wherein, the second network connection and the first network connection are accessible to the mobile device at overlapping or partially overlapping periods of time.

4. The method of claim 1, further comprising:
   aggregating by the connectivity engine, the data received over at least two of the multiple different networks connections to expedite data retrieval for the first mobile application and the second mobile application.

5. The method of claim 1, wherein, the data for the first mobile application and the data for the second mobile application is received over the second network connection in response to the first network connection being disconnected at the mobile device.

6. The method of claim 1, wherein, the anticipating or predicting is location based.

7. The method of claim 1, wherein, the data for the mobile application is received over the first network connection different than the first network connection in response to the mobile device becoming connected to the second network connection in addition to the first network connection.

8. The method of claim 7, wherein, the mobile device becomes connected to the second network connection to increase bandwidth.

9. The method of claim 1, wherein, the second network connection is a cellular connection including one or more of 3G, 3.5G, HSPA, 4G or LTE connection and the first network connection includes a WIFI or WiMax connection.

10. The method of claim 1, wherein, the second network connection is a 3G connection and the first network connection is a 4G or LTE connection.

11. The method of claim 1, wherein the determined amount of the data received from the first network connection is determined based on connection quality and bandwidth of the second network connection and the first network connection.

12. The method of claim 1, wherein, the determined amount of data received over the second network connection and the data received by the connectivity engine from the first network connection are retrieved or received at an interface able to identify an application class of the application to which the data is directed, wherein, the interface is associated with a relay for the application class based on a protocol utilized for the application class.

13. A mobile device having a plurality of mobile applications installed thereon, the mobile device comprising:
   one or more radios each operable to connect to a first network and a second network;
   a processor;
   a memory coupled to the processor having instructions stored thereon which, when executed by the processor, causes the mobile device to:
      anticipate that the first network is to be disconnected;

in response to anticipating that the first network is to be disconnected:
  determine an amount of data to be received from the first network connection to provide a first mobile application with continuous data flow when connecting to the second network connection; and
  determine an amount of data to be received from the first network connection to provide a second mobile application with continuous data flow when connecting to the second network connection;
service the first application using the determined data received via a radio connected to the second network and further service the first mobile application using additional data received using the radio or another radio connected to a different network,
service the second mobile application using data received via the radio connected to the second network and further service the second application using additional data received using the radio or another radio connected to a different network,
wherein the data and the additional data is received by the first and second mobile application in a continuous data flow without interruption,
wherein the amount of the additional data received from the additional network is determined based on connection quality or bandwidth of the first network or the second network;
wherein a connectivity engine of the mobile device anchors the continuous data flow such that second network connection parameters utilized by the first network and the second network are not visible to or detectable by the application.

14. The mobile device of claim 13, further comprising:
an interface coupled to the radios, the interface configured to aggregate data received from the radios and provide the aggregated data to the first and second mobile application in the continuous data flow without interruption.

15. The mobile device of claim 14, wherein, the interface is configured to aggregate data received over the first and second networks to expedite data retrieval for the first and second mobile application, wherein the data is received over the at least two of the one or more network concurrently.

16. The mobile device of claim 14, wherein, the interface provides a socket to each of the first and second mobile application and provides the aggregated data to the first and second mobile application; and wherein the socket is assigned based on a protocol used by each of the first and second mobile application.

17. The mobile device of claim 13, wherein, the radio is disconnected before the another radio is connected.

18. The mobile device of claim 13, wherein, the another radio is connected before the radio is disconnected.

19. The mobile device of claim 13, wherein, the data and the additional data is received by the first and second mobile application continuously even when the different network causes a new TCP session to be established.

20. The mobile device of claim 13, wherein, the radios include a cellular radio and or a Bluetooth radio.

21. The mobile device of claim 13, wherein, the radios include a WiFI or WLAN interface.

22. The mobile device of claim 13, wherein, the radios include a cellular radio able to connect to a 3G network, an LTE network, an enhanced 3G network or a 4G network.

23. The mobile device of claim 13, wherein, the each of the first and second mobile application includes one or more of, a mobile browser, a video application, a streaming service, an email service, and an FTP site/service.

24. The mobile device of claim 13, wherein, the first and second mobile application includes, one or more of, a VoiP application, a gaming application.

25. A system for providing data to a mobile application via multiple different network connections without interruption, the system comprising:
a connectivity engine configured for:
  receiving data for a first mobile application and a second mobile application over a second network connection different from a first network connection;
  anticipating that the first network connection is to be disconnected;
  in response to anticipating that the first network connection is to be disconnected:
    determining an amount of data to be received from the first network connection to provide a first mobile application with continuous data flow when connected to the second network connection; and
    determining an amount of data to be received from the first network connection to provide a second mobile application with continuous data flow when connecting to the second network connection; and
  providing the determined amount of data received over the second network connection after providing data received by the connectivity engine from the first network connection to the first mobile application and the second mobile application in a continuous data flow without interruption,
wherein the amount of the data received for the first mobile application and the second mobile application from the first network connection is determined based on connection quality or bandwidth of at least one of the second network connection or the first network connection,
wherein the connectivity engine anchors the continuous data flow such that different network connection parameters utilized by the second network connection and the first network connection are not visible to or detectable by the mobile application.

26. A method of providing data to a mobile application accessible at a mobile device via multiple different network connections without interruption, the method comprising:
receiving, by a connectivity engine of the mobile device, data for the mobile application over a second network connection different than a first network connection;
anticipating that the first network connection is to be disconnected;
in response to anticipating that the first network connection is to be disconnected, determining an amount of data to be received from the first network connection to provide the mobile application with continuous data flow when connecting to the second network connection;
providing the determined amount of data received over the second network connection after providing data received by the connectivity engine from the first network connection to the mobile application in a continuous data flow without interruption;
wherein the amount of the data received from the first network connection is determined based on connection quality or bandwidth of the second network connection or the first network connection;
wherein the connectivity engine anchors the continuous data flow such that different network connection parameters utilized by the network connection and the first network connection are not visible to or detectable by the mobile application,
wherein the determined amount of data received over the second network connection and the data received by the connectivity engine from the first network connection are retrieved or received at an interface able to identify an application class of the application to which the data is directed, wherein, the interface is associated with a relay for the application class based on a protocol utilized for the application class.

\* \* \* \* \*